US009496997B2

(12) United States Patent
Park et al.

(10) Patent No.: US 9,496,997 B2
(45) Date of Patent: Nov. 15, 2016

(54) METHOD AND APPARATUS FOR MEASURING CHANNEL IN WIRELESS COMMUNICATION SYSTEM

(71) Applicant: LG ELECTRONICS INC., Seoul (KR)

(72) Inventors: Hanjun Park, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/425,562

(22) PCT Filed: Sep. 3, 2013

(86) PCT No.: PCT/KR2013/007941
§ 371 (c)(1),
(2) Date: Mar. 3, 2015

(87) PCT Pub. No.: WO2014/038834
PCT Pub. Date: Mar. 13, 2014

(65) Prior Publication Data
US 2015/0236825 A1  Aug. 20, 2015

Related U.S. Application Data

(60) Provisional application No. 61/697,812, filed on Sep. 7, 2012.

(51) Int. Cl.
*H04L 5/00* (2006.01)
*H04W 72/04* (2009.01)
*H04B 7/02* (2006.01)

(52) U.S. Cl.
CPC ............ *H04L 5/0035* (2013.01); *H04B 7/024* (2013.01); *H04W 72/0406* (2013.01); *H04W 72/0473* (2013.01)

(58) Field of Classification Search
CPC ....... H04L 5/0035; H04L 5/00; H04L 5/001; H04B 7/024; H04B 17/27; H04B 17/309; H04B 17/318; H04B 7/26; H04W 72/0406; H04W 72/0473

USPC ......................................... 370/310, 328, 329
See application file for complete search history.

(56) References Cited

U.S. PATENT DOCUMENTS

2012/0155291 A1   6/2012  Koivisto et al.
2013/0039199 A1*  2/2013  Liao .................... H04B 7/0626
                                                       370/252
(Continued)

FOREIGN PATENT DOCUMENTS

JP    2011-166713    8/2011
WO    2011/013986    2/2011
WO    2012/105793    8/2012

OTHER PUBLICATIONS

Kiiski, "LTE-Advanced: The Mainstream in Mobile Broadband Evolution," 2010 European Wireless Conference, IEEE, Apr. 2010, pp. 983-988.

(Continued)

*Primary Examiner* — Chi H Pham
*Assistant Examiner* — Robert Lopata
(74) *Attorney, Agent, or Firm* — Lee Hong Degerman Kang Waimey

(57) ABSTRACT

A method and apparatus for performing channel measurement in a wireless communication system are disclosed. A method for performing channel measurement by a user equipment (UE) in a wireless communication system supporting carrier aggregation (CA) and coordinated Multi-point transmission and reception (CoMP) includes: receiving information on a channel state information—reference signal (CSI-RS) resource set (hereinafter referred to as CRMS (CoMP resource management set)) for measuring CSI-RS—based received power from serving evolved NodeB (eNB); measuring a received power for the CSI-RS resources contained in the CRMS; and transmitting the measured received power to the serving eNB, wherein the CRMS is independently configured for each of the plurality of component carriers (CCs) capable of being aggregated in the carrier aggregation (CA).

10 Claims, 10 Drawing Sheets

(56) References Cited

U.S. PATENT DOCUMENTS

| | | | | |
|---|---|---|---|---|
| 2013/0121270 A1* | 5/2013 | Chen | ................. | H04L 5/001 370/329 |
| 2013/0260741 A1* | 10/2013 | Yamada | ................. | H04W 24/00 455/422.1 |
| 2013/0286866 A1* | 10/2013 | Hammarwall | ................. | H04B 7/024 370/252 |
| 2013/0336269 A1* | 12/2013 | Davydov | ................. | H04W 4/06 370/329 |
| 2014/0029458 A1* | 1/2014 | Ye | ................. | H04W 24/10 370/252 |
| 2014/0036796 A1* | 2/2014 | Etemad | ................. | H04W 24/04 370/329 |
| 2014/0044040 A1* | 2/2014 | Chen | ................. | H04W 24/02 370/328 |
| 2015/0124638 A1* | 5/2015 | Sun | ................. | H04L 5/0053 370/252 |
| 2015/0131568 A1* | 5/2015 | You | ................. | H04L 5/001 370/329 |
| 2015/0171984 A1* | 6/2015 | Jitsukawa | ................. | H04B 7/024 370/329 |

OTHER PUBLICATIONS

PCT International Application No. PCT/KR2013/007941, Written Opinion of the International Searching Authority dated Dec. 16, 2013, 9 pages.

* cited by examiner

METHOD AND APPARATUS FOR MEASURING CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2013/007941, filed on Sep. 3, 2013, which claims the benefit of U.S. Provisional Application Ser. No. 61/697,812, filed on Sep. 7, 2012, the contents of which are all hereby incorporated by reference herein in their entirety.

TECHNICAL FIELD

The present invention relates to a wireless communication system, and more particularly to a method and apparatus for measuring a channel in a wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for efficiently performing channel measurement in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for measuring channel by a user equipment (UE) in a wireless communication system supporting carrier aggregation (CA) and coordinated Multi-point transmission and reception (CoMP) including: receiving information on a channel state information—reference signal (CSI-RS) resource set (hereinafter referred to as CRMS (CoMP resource management set)) for measuring CSI-RS—based received power from a serving evolved NodeB (eNB); measuring received power for the CSI-RS resources contained in the CRMS; and transmitting the measured received power to the serving eNB, wherein the CRMS is independently configured for each of a plurality of component carriers (CCs) capable of being aggregated in the carrier aggregation (CA).

Preferably, the method may further include: if activation/deactivation information on a secondary cell (SCell) corresponding to at least one component carrier (CC) from among the plurality of CCs received from the serving eNB includes specific information indicating deactivation of the SCell, allocating measurement capability of the at least one CC to the remaining CCs from among the plurality of CCs during the deactivation of the SCell.

Preferably, the method may further include: if activation/deactivation information on a secondary cell (SCell) corresponding to at least one component carrier (CC) from among the plurality of CCs received from the serving eNB includes specific information indicating deactivation of the SCell, receiving an instruction to measure a received power of CSI-RS resources contained in a CRMS configured for at least one CC corresponding to the SCell from the serving eNB; and measuring the received power for the CSI-RS resources contained in the CRMS configured for the at least one CC in response to the instruction.

Preferably, a period for measuring the received power during the deactivation of the SCell is different from a period for measuring the received power during the activation of the SCell Preferably, the method may further include: if activation/deactivation information on a secondary cell (SCell) corresponding to at least one component carrier (CC) from among the plurality of CCs received from the serving eNB includes specific information indicating activation of the SCell, measuring a received power for CSI-RS resources contained in a CRMS configured for at least one CC corresponding to the SCell during a predetermined period of time, prior to activation of the SCell.

Preferably, the predetermined period of time may be configured via higher layer signaling.

Preferably, the measurement of the received power for the CSI-RS resources contained in the CRMS configured for at least one CC corresponding to the SCell during the predetermined period of time prior to activation of the SCell may be performed when a deactivation time period of the SCell is longer than a predetermined length.

Preferably, the method may further include: receiving information indicating that a CRMS configured for at least one of the plurality of component carriers (CCs) is integrated with a CRMS for a specific component carrier (CC) from the serving eNB.

Preferably, the method may further include: allocating measurement capability for the at least one of the plurality of CCs to a measurement for the specific CC.

Preferably, the method may further include: performing intra-frequency measurement for a CRMS (hereinafter referred to a first CRMS) configured for one of the plurality of CCs, and performing inter-frequency measurement for CRMSs (hereinafter referred to as a second CRMS) configured for another of the plurality of CCs, wherein the first CRMS is larger in size than the second CRMS, and a period for reporting the intra-frequency measurement of the first CRMS is shorter than a period for reporting the inter-frequency measurement of the second CRMS.

In accordance with another aspect of the present invention, a user equipment (UE) configured to measure channel in a wireless communication system supporting carrier aggregation (CA) and coordinated Multi-point transmission and reception (CoMP) includes: a radio frequency (RF) unit; and a processor configured to control the RF unit, wherein the processor is configured to receive information on a channel state information—reference signal (CSI-RS) resource set (hereinafter referred to as CRMS (CoMP resource management set)) for measuring CSI-RS—based received power from a serving evolved NodeB (eNB), measure a received power for the CSI-RS resources contained in the CRMS, and transmit the measured received power to the serving eNB, and the CRMS is independently configured for each of a plurality of component carriers (CCs) capable of being aggregated in the carrier aggregation (CA).

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention can efficiently perform channel measurement in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
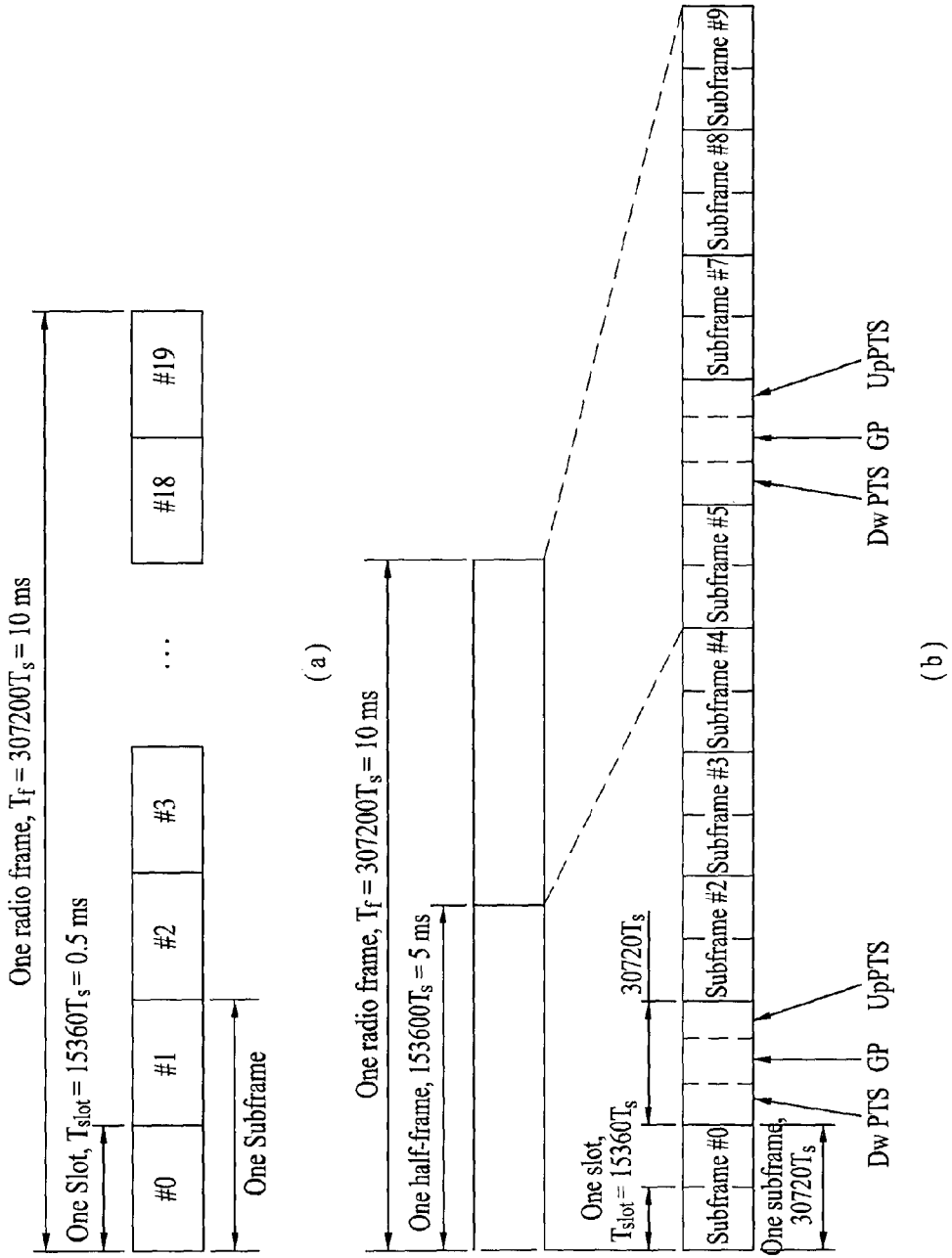
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/ uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
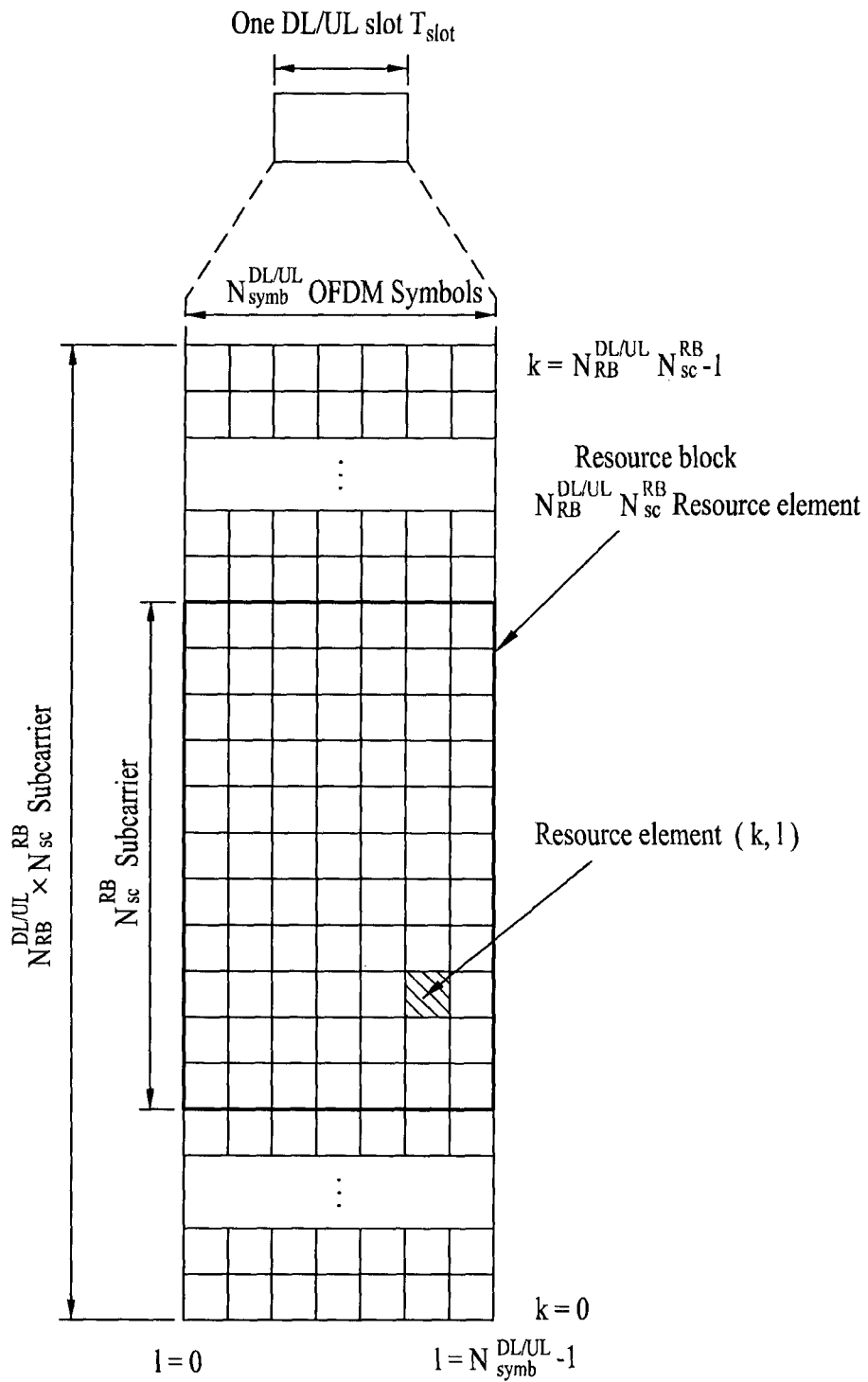
FIG. 2 exemplarily shows a downlink/uplink (DL/UL) slot structure for use in a wireless communication system.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $ND_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, 1) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
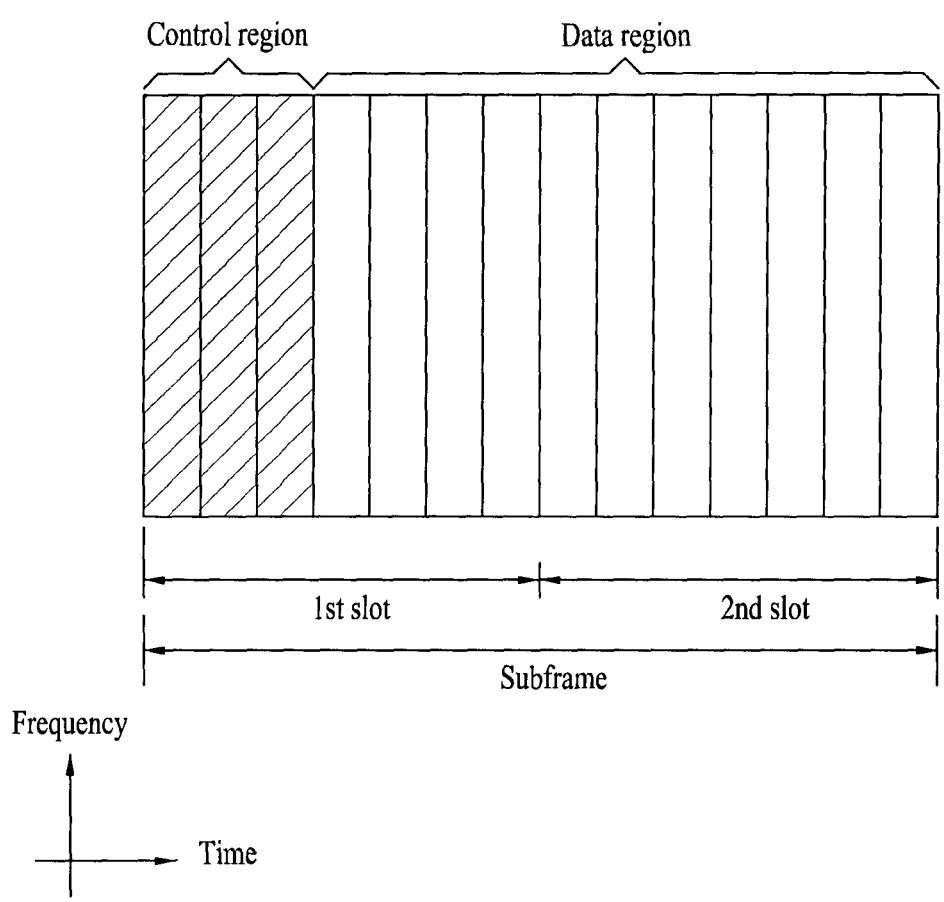
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate within a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
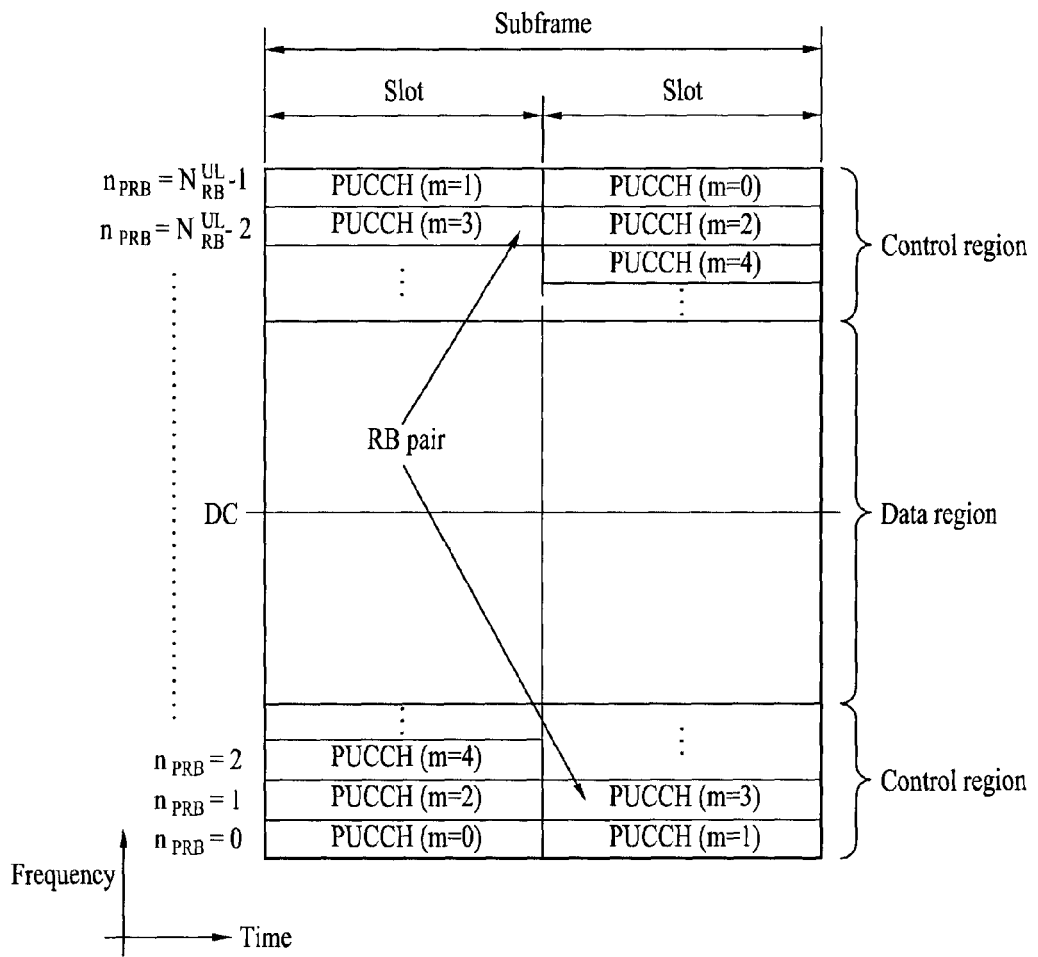
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACKNACK information.

Carrier Aggregation (CA)

Figure 5:
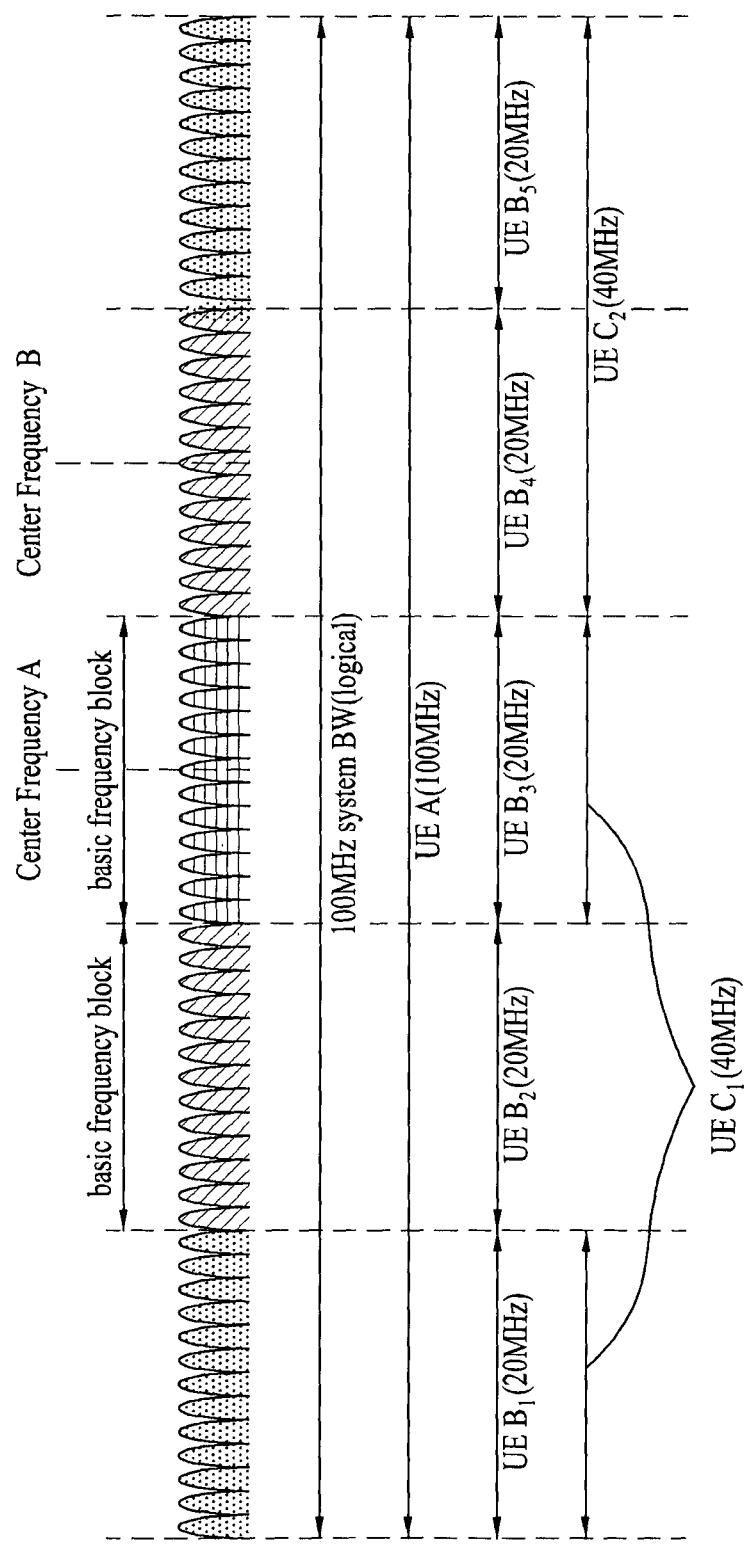
FIG. 5 is a conceptual diagram illustrating a carrier aggregation (CA) scheme.

Carrier aggregation will hereinafter be described in detail. FIG. 5 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 5, the entire system bandwidth (System BW) includes a bandwidth of 100MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 5, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 5, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or non-contiguous. The UE $C_1$ uses two non-contiguous CCs and the UE $C_2$ uses two contiguous CCs.

Figure 8:
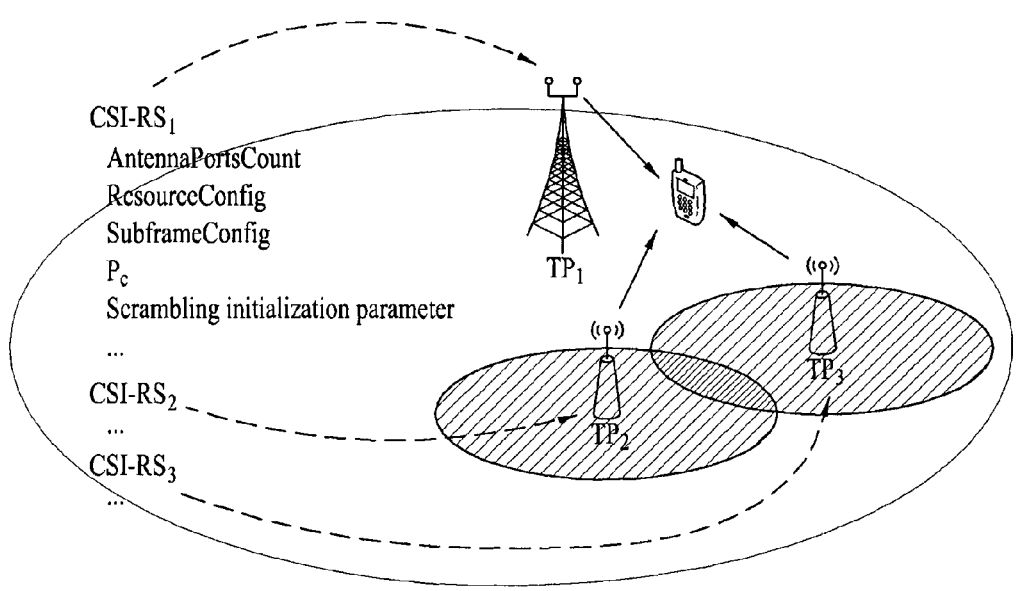
FIG. 8 shows exemplary CoMP measurement sets according to embodiment(s).

One downlink CC and one uplink CC may be used in the LTE system and several CCs may be used in the LTE-A system as shown in FIG. 8. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 6:
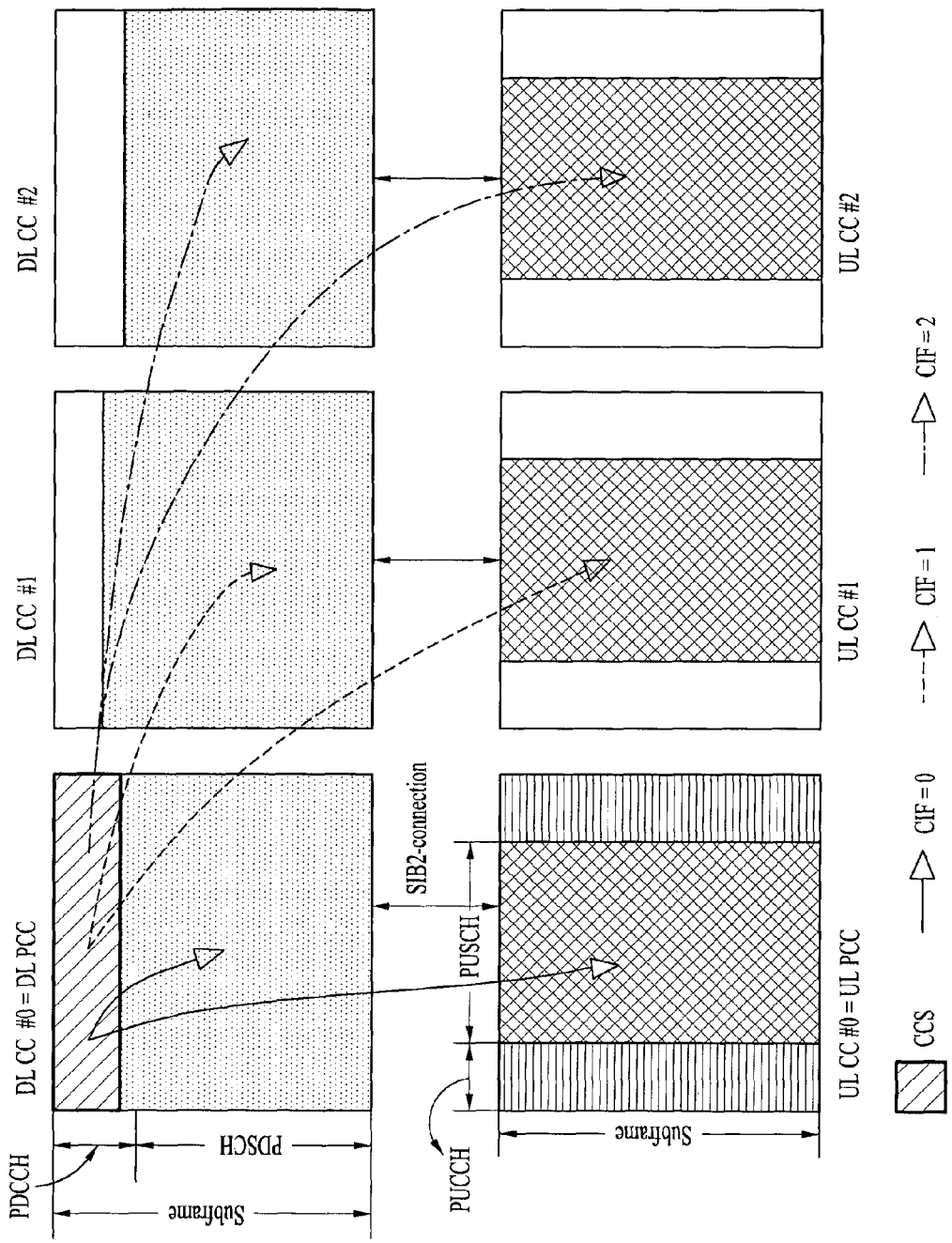
FIG. 6 is a conceptual diagram illustrating a cross-carrier scheduling scheme.

FIG. 6 is a conceptual diagram of a cross carrier scheduling scheme. Specifically, as can be seen from FIG. 6, the number of cells (or CCs) allocated to a relay node (RN) is set to 3, cross carrier scheduling is carried out using a CIF as described above. In this case, it is assumed that a downlink cell (or CC) #A is set to a primary downlink CC (i.e., a primary cell PCell), and the remaining CCs #B and #C are used as secondary cells (SCells).

CoMP (Coordinated Multiple Point transmission and reception operation)

Figure 7:
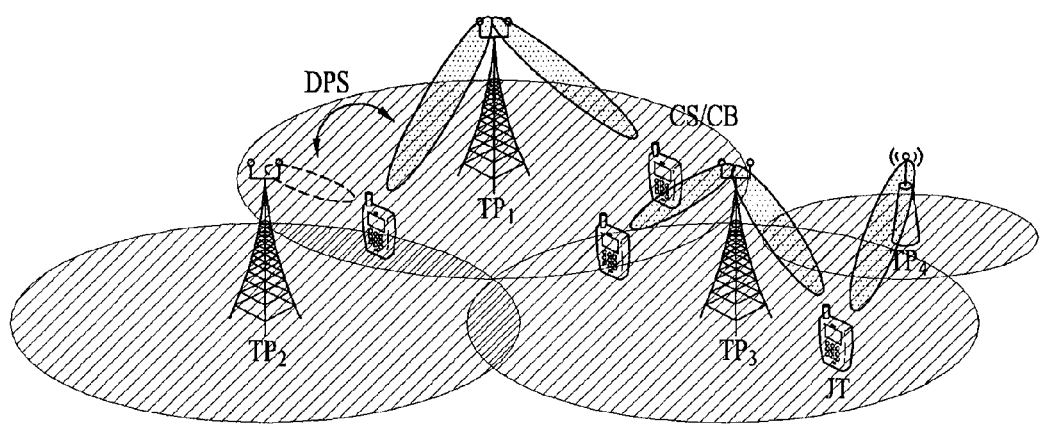
FIG. 7 is a conceptual diagram illustrating a wireless communication system for implementing a Coordinated Multiple Point (CoMP) transmission and reception scheme according to embodiment(s).

FIG. 7 is a conceptual diagram illustrating a network structure for use in a CoMP (Coordinated Multiple Point) transmission and reception scheme according to one embodiment of the present invention. FIG. 7 is a conceptual diagram illustrating a heterogeneous network (HetNet) environment in which the CoMP UE connected to different DL/UL serving cells is connected to the serving cells. Although FIG. 7 shows four eNBs (TP1, TP2, TP3, TPR) and four UEs, the scope or spirit of the present invention is not limited thereto and many more eNBs and many more UEs can also be present in the above network structure.

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

In 3GPP LTE Rel-11, a UE acting as a target of the CoMP scheme can estimate a channel of TPs capable of provisionally participating in the CoMP using CSI-RS (channel state information reference signal) resources defined as a CoMP measurement set, and feeds back CSI (such as PMI (precoding matrix indicator), CQI (channel quality indicator), RI (rank indicator), etc.) to its own serving cell on the basis of the estimated channel value. In the network, the UE may establish a Dynamic Point Selection (DPS) scheme in which s a TP having a relatively-superior channel quality is selected on the basis of the feedback CSI and data is transmitted to the UE, the CS/CB (coordinated scheduling/coordinated beamforming) scheme in which TPs participating in the CoMP control scheduling and beamforming so as to reduce inter-interference, and a Joint Transmission (JT) scheme in which TPs participating in the CoMP transmit the same data to the UE.

The 3GPP LTE Rel-11 system has defined a set of CSI-RS resources for performing CSI feedback as a CoMP measurement set in such a manner that the CoMP measurement set can be utilized for the CoMP scheme according to necessity of a network. The CSI-RS resources may correspond to a specific TP configured to perform the CoMP operation. CSI fed back from the CSI-RS resources may be utilized to perform various CoMP operations, for example, coordinated scheduling/coordinated beamforming (CS/CB), joint transmission (JT), and dynamic point selection (DPS). For example, it is assumed that one CSI-RS resource is allocated to each of three transmission points (TPs) (i.e., $TP_1$, $TP_2$, $TP_3$) respectively referred to as $CSI-RS_1$, $CSI-RS_2$, $CSI-RS_3$. Under the above assumption, the CoMP measurement set may be defined as $\{CSI-RS_1, CSI-RS_2, CSI-RS_3\}$. In this case, CSIs fed back from individual CSI-RS resources may indicate $TP_1$, $TP_2$, and $TP_3$, respectively. Therefore, it is possible to guarantee a CSI needed for the CoMP operation among $TP_1$, $TP_2$, and $TP_3$ through the CoMP measurement set $\{CSI-RS_1, CSI-RS_2, CSI-RS_3\}$. In this case, it is not always necessary for one CSI-RS resource to correspond to one TP as shown in the above example, and one CSI-RS resource may be defined to cover several TPs as necessary.

A CoMP measurement set defined in the LTE Rel-11 system may have a series of correspondence relationships in association with TPs configured to feed back a CSI so as to support the CoMP operation. In this case, the network for use in the LTE system may determine which TPs will be mapped to CSI-RS resources corresponding to the CoMP measurement using which one of schemes. Meanwhile, the network may also determine which CSI-RS resources will be established as a CoMP measurement set for a specific UE supporting the CoMP scheme. In this case, the UE may feed back specific information available for such decision of the network. For example, the UE may measure the intensity of a reception (Rx) signal received from individual TPs, and may feed back the measured Rx signal to a serving eNB (evolved Node B).

In order to facilitate decision of the COMP measurement set, a specific scheme has been discussed, in which Reference Signal Received Power (RSRP) and CSI-RSRP based on the CSI-RS resource are introduced into the LTE Rel-11 in association with information fed back from a UE, and RSRP corresponding to the CSI-RS resource included in the CSI-RS resource set defined as a CoMP resource management set (CRMS) is fed back to the network, such that the network can recognize RSRP for TPs corresponding to the corresponding CSI-RS resource. The network may establish the CRMS for a specific UE supporting the CoMP scheme through a higher layer signal. In this case, the CRMS may temporarily indicate target TPs for RSRP measurement corresponding to the corresponding CSI-RS resources.

Meanwhile, the CA environment network management for combining a plurality of frequency bands has been considered in the 3GPP LTE Rel-11 system. Carrier corresponding to each frequency band is defined as a component carrier (CC), and a maximum of 5 CCs can be combined with one another. A cell managing system information is defined as a primary cell (PCell), each of the remaining cells other than the cell is defined as a secondary cell (SCell), and a carrier corresponding to PCell is defined as a primary CC (PCC). In this case, Scells may be established for a UE supporting the CA scheme through SCell configuration transferred b a higher layer signal, and the UE may always establish the ACK/NACK feedback channel for SCells contained in SCell configuration. However, actual data transmission/reception may follow activation/deactivation configuration transferred through the MAC layer, and data transmission/reception may be performed only in Scell staying in an active state.

Figure 9:
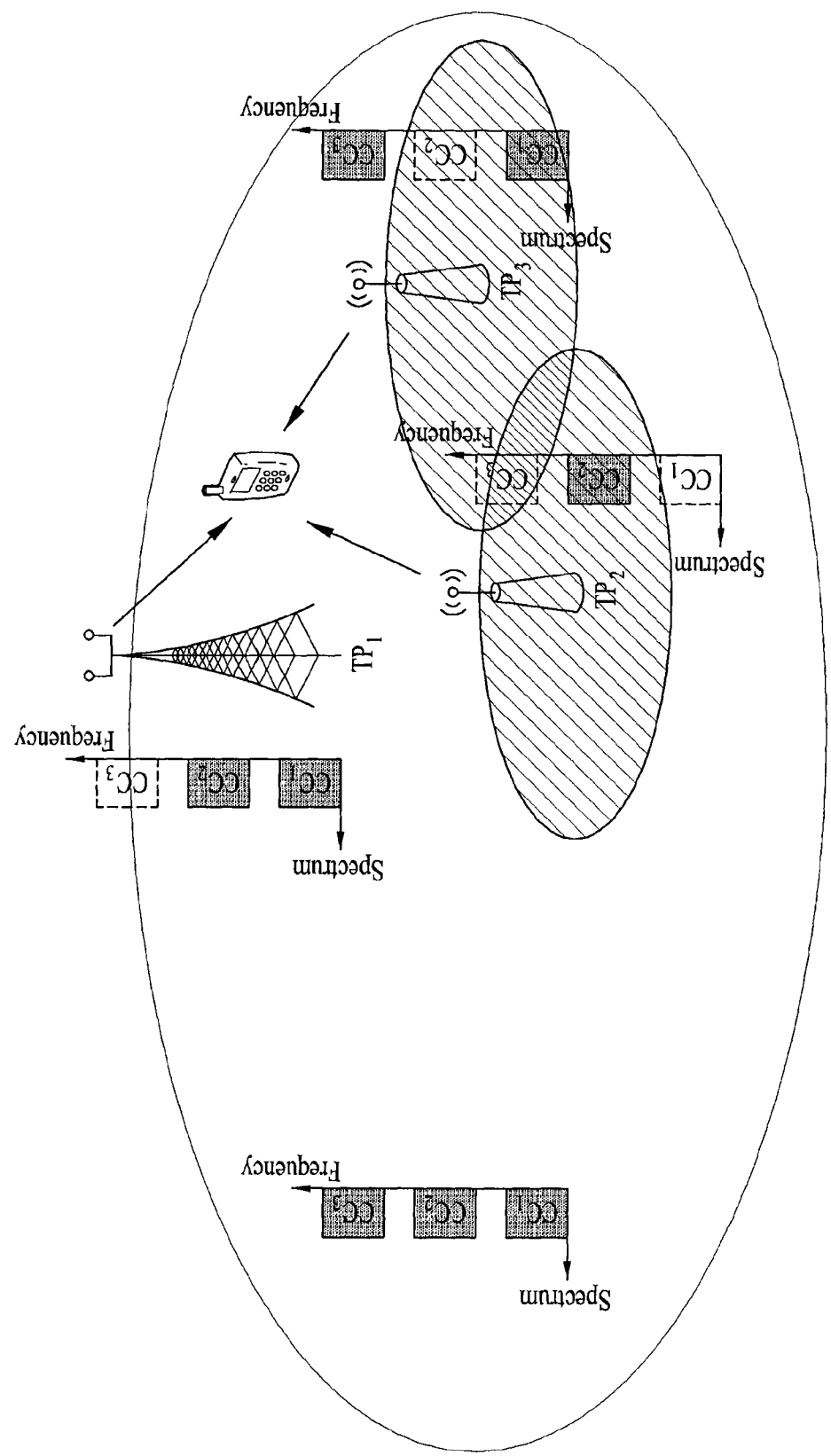
FIG. 9 shows an exemplary wireless communication system for implementing CA and CoMP according to embodiment(s).

The LTE system after Rel-12 may consider the environment to which the CA scheme and the CoMP scheme of each frequency band are simultaneously applied. FIG. 9 shows one exemplary COMP operation in which the carrier aggregation (CA) is considered. In this case, $TP_1$ operates in each of frequency bands ($CC_1$, $CC_2$) and $TP_2$ operates in a frequency band ($CC_2$), and $TP_3$ operates in each of frequency bands ($CC_1$, $CC_3$). That is, the operation bands of a plurality of TPs are identical to each other, or only some or all of the operation bands may be identical to or different from each other. CRMS established for the CoMP scheme under the above environment needs to be applied to the CA environment including a plurality of CCs. The scheme for defining an independent CRMS for each CC may be used. However, as described above, the CRMS based physical layer measurement (for example, CSI-RSRP) and report for a CC corresponding to SCell of the CA environment may be meaningless according to whether the corresponding SCell is configured and activated/or deactivated. For example, assuming that data transmission/reception is not performed in the configured SCell under the condition that a specific SCell is deactivated, the CRMS based physical layer measurement (for example, CSI-RSRP) need not be reported to the network. Due to the above-mentioned viewpoint, CRMS based physical layer measurement and report (i.e., specific information indicating whether CSI-RSRP is measured and specific information indicating whether the measurement result is reported) must be defined.

Meanwhile, assuming that the UE does not perform the CRMS based physical layer measurement and report in a deactivation period of the SCell, measurement capability of the UE of the corresponding CC can be more efficiently utilized among a plurality of CCs. For example, it is assumed that the E can simultaneously perform the CRSM based physical layer measurement of M CCs under the CA environment supporting a maximum number of M CCs. In this case, assuming that some CCs from among the M CCs may correspond to SCells and the corresponding SCells are deactivated, UE measurement capability (for example, a circuit for measurement) allocated to the corresponding CC may be utilized to measure a physical layer of other CCs during the deactivation time.

Therefore, a wireless communication system for simultaneously supporting the CA scheme and the CoMP scheme proposes, in association with a CC corresponding to SCell, the CRMS based physical layer measurement and report operation scheme according to specific information indicating whether the corresponding SCell is configured and activated/deactivated, the CRMS based physical layer measurement and report operation scheme for a transition period between deactivation and activation states of the SCell, and the scheme for defining the extended CRMS through which the UE measurement capability of several CCs is focused on a single CC is proposed. In addition, when a circuit for physical layer measurement is limited by an additional operation due to the problem such as UE implementation costs, not only a differentiation method according to whether intra-/inter-frequency measurement of the CRMS per CC is performed for CRMS for each CC, but also the integrated CRMS concept corresponding to a plurality of CCs is proposed.

First Embodiment

In association with a CC corresponding to SCell according to one embodiment, the method for deciding whether the CRMS based physical layer and report is operated according to whether the corresponding SCell is configured and/or activated/deactivated will hereinafter be described in detail. First, assuming that a specific SCell is not contained in SCell configuration, the CRMS based physical layer measurement of the corresponding SCell is not obviously defined. However, SCell contained in the SCell configuration may have different activation/deactivation states according to MAC layer information. The embodiment proposes a method for deciding the physical layer measurement and report operation on the basis of the MAC layer information (i.e., activation/deactivation information).

For example, the activation/deactivation information may be defined as follows.

TABLE 4

| $C_7$ | $C_6$ | $C_5$ | $C_4$ | $C_3$ | $C_2$ | $C_1$ | R |
| --- | --- | --- | --- | --- | --- | --- | --- |

As can be seen from Table 4, the activation/deactivation information is composed of 7 C-fields and one R-field. If SCell corresponding to the SCell index i(SCellIndex$_i$) is established, $C_i$ may indicate the activation/deactivation state of the SCell corresponding to SCellIndex$_i$. If SCell corresponding to the SCell index i(SCellIndex$_i$) is not established, the UE may discard the $C_i$ field. In order to indicate activation of the SCell having SCellIndex$_i$, the $C_1$ field may be set to the value of 1. In order to indicate deactivation of the SCell having SCellIndex$_i$, the $C_i$ field may be set to the value of 0. R denotes a reserved bit, and is set to zero '0'.

On the contrary, the actual operation of the activation or deactivation is achieved after lapse of 8 subframes starting from a subframe in which the activation/deactivation information is received. That is, assuming that the activation/ deactivation information is received at the subframe (n), activation or deactivation of the SCell is achieved at the subframe (n+8).

In addition, assuming that SCell is deactivated, a deactivation timer (sCellDeactivationTimer) may be defined. If the deactivation timer (sCellDeactivationTimer) is established through higher layer signaling, the SCell activation state is maintained after lapse of 8 subframes starting from a specific subframe in which the deactivation timer (sCellDeactivationTimer) expires. Thereafter, the SCell is deactivated. That is, assuming that the deactivation timer has expired at the subframe (n), the SCell is deactivated at the subframe (n+8).

More specifically, assuming that SCell is activated, the CRMS based physical layer measurement and report operation for a CC of the corresponding SCell can be performed. In contrast, assuming that SCell is deactivated, the physical layer measurement and report operation for a CC of the corresponding SCell is not performed. The CRMS based physical layer measurement does not consider UE mobility support and is needed only for the CoMP scheme utilization aspect. If SCell is deactivated, there is no opportunity in participating in the CoMP scheme, and the network does not require the CRMS based physical layer measurement information at a CC of the corresponding SCell. In this case, activation/deactivation information is transferred through the MAC, and the possibility of causing a transmission error may be relatively higher than configuration information. If the UE corresponds to DTX on the basis of ACK/NACK feedback toward SCells, the UE may not perform the CRMS physical layer measurement of a CC of the corresponding SCell.

In addition, the UE may receive specific information indicating whether the CRMS based physical layer measurement is performed in a period of SCell deactivation through higher layer signals such as RRC, etc. In preparation for the case in which the SCell will be activated in future, the UE may measure a CSI-RS transmitted at a CC corresponding to the above SCell.

If physical layer measurement is achieved in the deactivation period, the CRMS based physical layer measurement period in the activation period and another CRMS based physical layer measurement period in the deactivation period may be differentially established. For example, whereas a time of 200 ms is used as the activation period, a time of 1 s may be used as the deactivation period.

Second Embodiment

The second embodiment will disclose the method for performing the CRMS based physical layer measurement and report operation in a transition period between the SCell activation and deactivation periods. According to the above operation, it is assumed that SCell is deactivated, and the UE does not perform the CRMS based physical layer measurement and report at a CC of the corresponding SCell. In this case, if SCell is re-transitioned to the activation state, there is a need to resume the CRMS based physical layer measurement. If the deactivation period is very long, the CRMS based physical layer measurement information is not present in the corresponding period, such that there may arise a time delay for the CRMS based physical layer measurement until the CoMP scheme is supported after completion of activation. Therefore, a length of the transition period between the deactivation and activation times of the SCell is established. Before such activation is achieved, the CRMS based physical layer measurement may be performed at a CC of the corresponding SCell for a specific time corresponding to the length of the transition period.

More specifically, the UE may establish a specific time period between a reception time of the above activation/deactivation information and an actual execution time of the SCell activation as the above transition time. For example, some parts of the subframe section between the subframe (n) and the subframe (n+8) may be established as the transition period. In this case, length information of the transition period may be established or provided through higher layer signaling in a different way from the activation/deactivation information, or may be a predetermined fixed value.

Third Embodiment

The third embodiment proposes a method for defining the extended CRMS through which measurement capability of several CCs is focused on a single CC under the CA environment. Assuming that only one CC is present in the non-CA environment, the CRMS size (i.e., a maximum number of CSI-RS resources included in CRMS) may be limited in consideration of complexity of a measurement circuit for measuring the CSI-RSRP and the like by the UE. For example, it is assumed that a maximum size of the CRMS under the non-CA environment is set to N. In this case, assuming that M CCs (for example, $CC_1$, $CC_2$, ,$CC_M$) are present in the CA environment, a maximum size of each CRMS (for example, $CRMS_1$, $CRMS_2$, . . . . , $CRMS_M$) for each CC may be limited to N as an example. In this case, the UE may assume that each CC has the measurement capability needed for measurement and report of N CSI-RSRP values in consideration of complexity of the measurement circuit. However, the measurement capability needed for each CC may be differently established according to the network environment. In this case, the scheme for fixing the measurement capability for each CC as described above may be far from efficient.

Therefore, the present invention proposes a method for allowing a plurality of CCs to share a measurement circuit so as to support an extended-sized CRMS for a specific CC. For example, if two CCs (for example, $CC_1$, $CC_2$) are present, it is assumed that the CoMP scheme is achieved at $CC_2$ under the network environment, and it is also assumed that each CC has a CRMS (for example, $CRMS_1$, $CRMS_2$) having a maximum size N. In this case, the measurement circuits for CC1 and CC2 are utilized for CC2, such that an extended CRMS (ECRMS) for supporting measurement of the CSI-RSRP having a maximum size of 2N can be established. In this case, it is necessary for the network to inform the UE of specific information indicating the number of CCs (e.g., 2 CCs) having measurement capability concentrated through ECRMS and other information (for example, $CC_2$) indicating which CC was defined. In addition, a current frequency is changed to another frequency when the $CC_1$ measurement circuit is used for $CC_2$ according to the length of the SCell deactivation period, such that it is possible to establish specific information indicating whether the system will be operated according to intra-frequency measurement, or it is possible to select other information indicating whether the system will be operated according to inter-frequency measurement after a measurement gap is established in response to the length of the deactivation period.

Fourth Embodiment

The fourth embodiment proposes the scheme for assigning differential restriction to a maximum size and report period of each measurement resource set according to application or non-application of the intra-/inter-frequency measurement scheme during the process for establishing a plurality of CRMSs for the CA and the CoMP operation. For example, 5 CRMS (for example, $S_i$, $S_2$, $S_3$, $S_4$, $S_5$) for 5 CCs (for example, $CC_1$, $CC_2$, $CC_3$, $CC_4$, $CC_5$) may be established. In this case, the UE may perform intra-frequency measurement for $S_i$ in consideration of costs and complexity, and may consider the intra-frequency measurement situation using the measurement circuit of $S_i$ in association with the other CRMs. As for general physical layer measurement in LTE Rel-10 in association with the above situation, it can be confirmed that the event triggering operation period for the CRS based RSRP is set to a very long transmission period (e.g., about 200 ms). Therefore, a method for reusing a single measurement circuit is better than a method for increasing costs by implementing a separate physical layer measurement circuit for each CC in terms of reduction of production costs.

Therefore, when intra-frequency measurement is performed for the measurement resource set, and when inter-frequency measurement is performed for the measurement resource set, the fourth embodiment may assign differential restriction not only to a maximum number of measurement target objects (i.e., the size of measurement resource sets) of each measurement resource set, but also to the report period. For example, according to CRS based RSRP measurement defined in LTE Rel-10, in the case of intra-frequency measurement, the event triggering operation is performed on a measurement value of a minimum of 8 cells at intervals of 200 ms. In the case of inter-frequency measurement, the event triggering operation is performed on a measurement value of a minimum of 4 cells for each of three frequencies at intervals of 480 ms. Similarly, the CRMS case in which intra-frequency measurement is performed on CRMs configured to perform CSI-RS based physical layer measurement under the CA environment may have a relatively longer maximum size and a relatively shorter report period as compared to the other CRMS case in which inter-frequency measurement is performed on CRMSs configured to perform CSI-RS based physical layer measurement under the CA environment.

Figure 10:
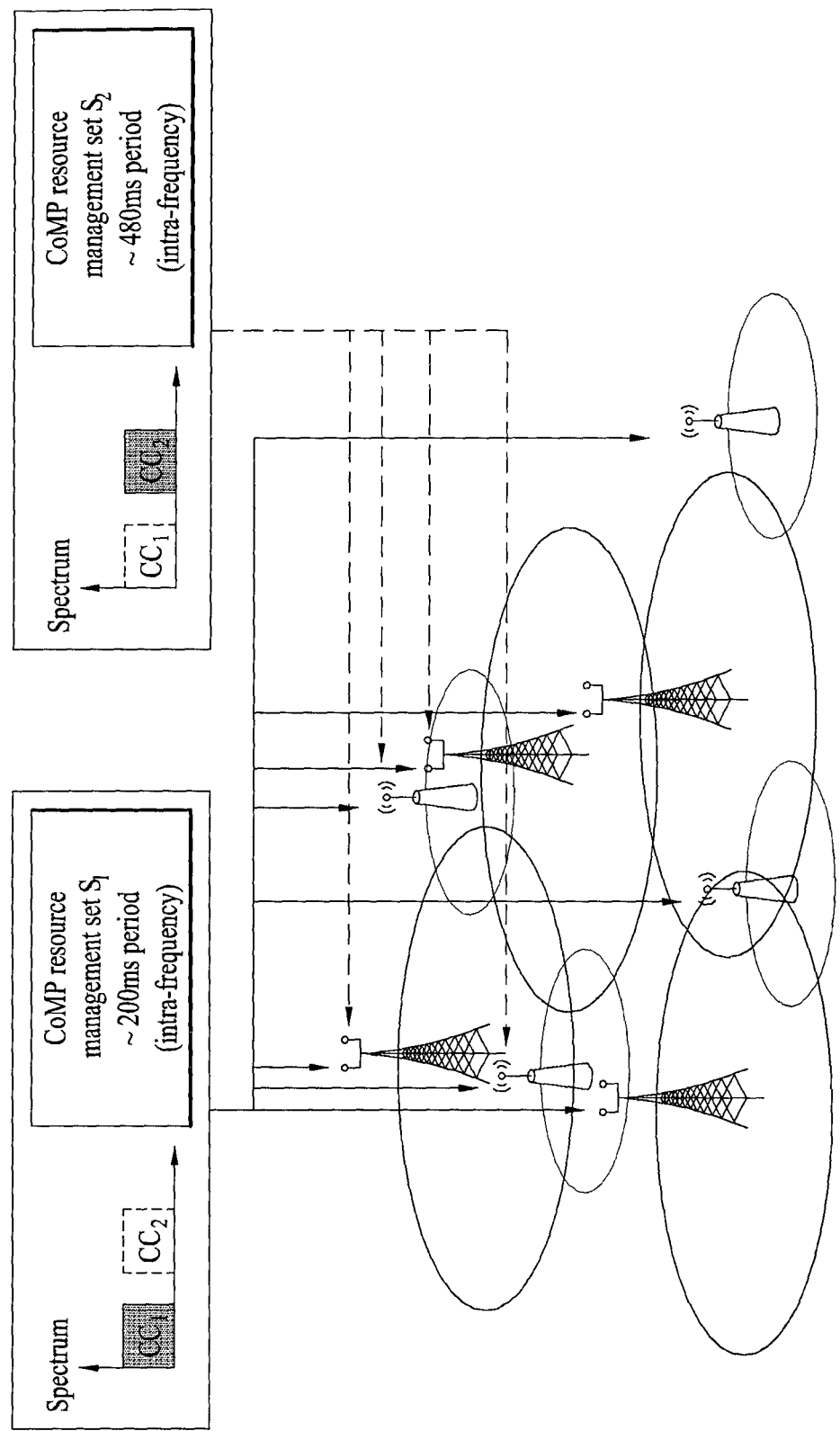
FIG. 10 shows an exemplary wireless communication system for implementing CA and CoMP according to embodiment(s).

In FIG. 10, $S_1$ and $S_2$ may correspond to $CC_1$ and $CC_2$, respectively. Under the condition that the UE performs intra-frequency measurement of $CC_1$ and inter-frequency measurement of $CC_2$, a conceptual diagram of a measurement resource set according to the above example is shown in FIG. 10. In this case, a maximum of 8 CSI-RS resources are measured by the intra-frequency measurement of $CC_1$, and the measurement result is reported at intervals of 200 ms. A maximum of CSI-RS resources are measured by the inter-frequency measurement of $CC_2$, and the measurement result is reported at intervals of 480 ms. The measurement circuit configured to perform the inter-frequency measurement is not always implemented as a single circuit, and may be identical to or smaller than a maximum number of frequency bands supporting the CoMP operation.

Fifth Embodiment

The fifth embodiment proposes the scheme for establishing a frequency band corresponding to CRMSs configured to perform intra-frequency measurement during the process for establishing a plurality of CRMSs for the CA and the CoMP operation. For example, if there is limitation in implementing the physical layer measurement circuit, the intra-frequency measurement may be performed on some CRMSs from among a plurality of CRMSs, and the inter-frequency measurement may be performed on other CRMSs. In this case, it is expected that CRMSs configured to perform intra-frequency measurement may have a relatively larger amount of measurement resources and a relatively shorter report period. Therefore, assuming that the network can determine the presence or absence of a frequency band having the efficient CoMP operation, the fifth embodiment may inform a UE of specific information indicating that the intra-frequency measurement based CRMS is mapped to a frequency band in which the above CoMP operation will be carried out.

Sixth Embodiment

The sixth embodiment will disclose a method for establishing a single integrated CRMS related to a plurality of CCs during the process for establishing a plurality of CRMSs for the CA and the CoMP operation. As discussed in LTE Rel-11, the CRMS based physical layer measurement may include CSI-RSRP information indicating path attenuation. Therefore, assuming that one TP transmits $CSI-RS_1$ at $CC_1$ and transmits $CSI-RS_2$ at $CC_2$ using the same transmission power, a CSI-RSRP value based on $CSI-RS_1$ specified by a UE may be similar to another CSI-RSRP value based on $CSI-RS_2$. From the above viewpoint, variation of the frequency band does not generate special variation of CSI-RSRP, a method for defining CRMS including a plurality of CCs to measure each distinctive TP may be more preferable than a method for defining CRMS per CC. Therefore, the sixth embodiment proposes a method for defining a single CRMS for a plurality of CCs and adding an index of the frequency band to attributes of CSI-RS contained in the CRMS. In this case, one measurement circuit for measuring a physical layer is not given to each frequency band, and many more measurement circuits in proportion to the number of CSI-RS resources contained in each frequency band may be assigned as necessary. For example, it is assumed that 5 measurement circuits for measuring a maximum of 8 physical layers are present. In this case, assuming that 12 CSI-RS resources of the frequency $f_1$ are assigned to the CRMS, two measurement circuits are assigned to the corresponding frequency.

Figure 11:
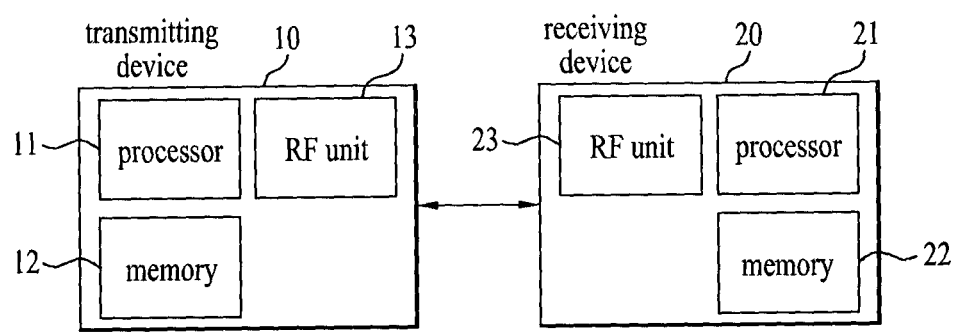
FIG. 11 is a block diagram illustrating a device for implementing embodiment(s) of the present invention.

FIG. 11 is a block diagram of a transmitting device 10 and a receiving device 20 configured to implement exemplary embodiments of the present invention. Referring to FIG. 11, a transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perfom at least one of the above-described embodiments of the present invention.

The memories 12 and 22 may store programs for processing and controlling the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to perform the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wish to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on an uplink and as the receiving device 20 on a downlink. In embodiments of the present invention, an eNB or BS serves as the receiving device 20 on an uplink and as the transmission device 10 on a downlink.

The transmitting device and/or the receiving device may be configured as a combination of one or more embodiments of the present invention.

The detailed description of the exemplary embodiments of the present invention has been given to enable those skilled in the art to implement and practice the invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The method and apparatus for performing channel measurement in a wireless communication system according to embodiments of the present invention can be applied to a UE, a relay, a BS (eNB), or other communication devices in a wireless communication system.

The invention claimed is:

1. A method for measuring channel by a user equipment (UE) in a wireless communication system supporting carrier aggregation (CA) and coordinated Multi-point transmission and reception (CoMP), the method comprising:
   receiving, by the UE from a serving evolved NodeB (eNB), information on a channel state information—reference signal (CSI-RS) resource set (hereinafter referred to as CRMS (CoMP resource management set)) for measuring CSI-RS-based received power,
   wherein the CRMS is independently configured for each of a plurality of component carriers (CCs) to be aggregated in the CA;
   receiving, by the UE from the serving eNB, activation/deactivation information on a secondary cell (SCell) corresponding to at least one component carrier (CC) from among the plurality of CCs; and
   if the activation/deactivation information indicates deactivation of the SCell:
      allocating, by the UE, a measurement capability for the at least one CC to the remaining activated CCs from among the plurality of CCs during the deactivation of the SCell;
      measuring, by the UE, a received power for the CSI-RS resources contained in the CRMS on the remaining activated CCs; and
      transmitting the measured received power by the UE to the serving eNB.

2. The method according to claim 1, further comprising:
   receiving an instruction to measure the received power for the CSI-RS resources contained in a CRMS on the remaining activated CCs.

3. The method according to claim 2, wherein:
   a period for measuring the received power during the deactivation of the SCell is different from a period for measuring the received power during an activation of the SCell.

4. The method according to claim 1, further comprising:
   if the activation/deactivation information indicates activation of the SCell, measuring a received power for CSI-RS resources contained in a CRMS configured for at least one CC corresponding to the SCell during a predetermined period of time, prior to activation of the SCell.

5. The method according to claim 4, wherein the predetermined period of time is configured via higher layer signaling.

6. The method according to claim 4, wherein the measurement of the received power for the CSI-RS resources contained in the CRMS configured for at least one CC corresponding to the SCell during the predetermined period of time prior to activation of the SCell is performed when a deactivation time period of the SCell is longer than a predetermined length.

7. The method according to claim 1, further comprising:
   receiving information indicating that a CRMS configured for at least one of the plurality of component carriers (CCs) is integrated with a CRMS for a specific component carrier (CC) from the serving eNB.

8. The method according to claim 7, further comprising:
   allocating measurement capability for the at least one of the plurality of CCs to a measurement for the specific CC.

9. The method according to claim 1, further comprising:
   performing intra-frequency measurement for a CRMS (hereinafter referred to a first CRMS) configured for one of the plurality of CCs, and performing inter-frequency measurement for CRMSs (hereinafter referred to as a second CRMS) configured for another of the plurality of CCs,
   wherein the first CRMS is larger in size than the second CRMS, and a period for reporting the intra-frequency measurement of the first CRMS is shorter than a period for reporting the inter-frequency measurement of the second CRMS.

10. A user equipment (UE) configured to measure channel in a wireless communication system supporting carrier aggregation (CA) and coordinated Multi-point transmission and reception (CoMP), the user equipment (UE) comprising:
   a radio frequency (RF) unit; and
   a processor configured to control the RF unit,
   wherein the processor is configured to:
      receive, from a serving evolved NodeB (eNB), information on a channel state information—reference signal (CSI-RS) resource set (hereinafter referred to as CRMS (CoMP resource management set)) for measuring CSI-RS—based received power,
      wherein the CRMS is independently configured for each of a plurality of component carriers (CCs) to be aggregated in the CA,
      receive, from the serving eNB, activation/deactivation information on a secondary cell (SCell) corresponding to at least one component carrier (CC) from among the plurality of CCs, and
      if the activation/deactivation information indicates deactivation of the SCell:
         allocate a measurement capability for the at least one CC to the remaining activated CCs from among the plurality of CCs during the deactivation of the SCell,
         measure a received power for the CSI-RS resources contained in the CRMS on the remaining activated CCs, and
         transmit the measured received power to the serving eNB.

* * * * *